Dec. 14, 1965     F. R. TIETGE     3,223,190
POSTAGE SCALE WEIGHT AND VOLUME MEASURE
Filed June 16, 1964     2 Sheets-Sheet 1

INVENTOR.
Fred R. Tietge
BY Fulwider, Patton,
Rieber, Lee & Utecht

Dec. 14, 1965     F. R. TIETGE     3,223,190

POSTAGE SCALE WEIGHT AND VOLUME MEASURE

Filed June 16, 1964     2 Sheets-Sheet 2

Fig. 3

INVENTOR.

Fred R. Tietge

BY Fulwider, Patton, Rieber, Lee & Utecht 3,223,190
POSTAGE SCALE WEIGHT AND VOLUME
MEASURE
Fred R. Tietge, 3963 Mount Blackburn Ave.,
San Diego, Calif.
Filed June 16, 1964, Ser. No. 375,618
1 Claim. (Cl. 177—207)

The present invention relates to a hydrostatic scale and more particularly to a combination hydrostatic scale and measuring cup.

The hydrostatic scale of the present invention comprises an integral open top container for liquid, such as water, and an integral float in the container which is capable of floating on the liquid in the container. These two elements have vertical sections which are juxtaposed throughout at least the vertical extent of movement of the float for the purpose of limiting the horizontal shifting of the float throughout its extent of vertical movement. The float is provided with weight indicating indicia.

Either the container of the float includes horizontally spaced and vertically extending, integrally formed sections. Such sections, of the element having the same, are juxtaposed the other of the elements for limiting the aforesaid shifting of the float. In the embodiment illustrated, the float is rectangularly shaped to provide a plurality of corners and the container is cylindrically shaped. The cross sectional dimension of the float, with respect to the inside diameter of the container is such that the corners of the float are juxtaposed to the inside wall of the container.

The float of the present invention is in the form of an open top container and is provided with indicia indicating volumes whereby it can be used as a measuring cup.

Other features and the advantages of the present invention will be apparent from the following description, reference being had to the accompanying drawing wherein a preferred embodiment of the invention is illustrated.

In the drawing:

FIG. 3 is a composite view of the indicia on the cup.

Figure 2:
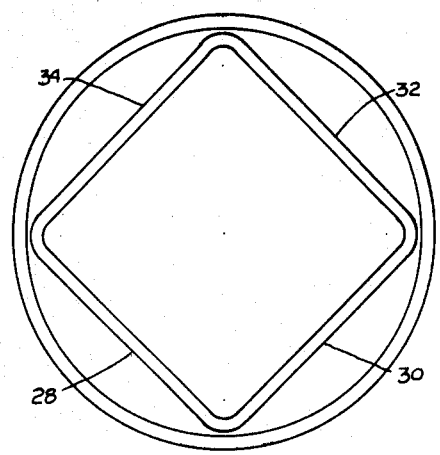
FIG. 2 is a top plan view of the device.

Referring more in detail to the drawing, the device is shown at 20. It includes an outer container 22, a float 24 having indicia. The container contains a liquid such as water, the level of which is indicated at 26.

One of these elements, namely the container or the float, is provided with integral vertical sections which are juxtaposed the other element throughout the vertical extent of movement of the float for limiting horizontal shifting of the float whereby the float is maintained erect. In the present disclosure, one of these elements has an arcuately shaped surface defined by at least one vertical axis and the other of these elements has vertically extending corners throughout the vertical extent of movement of the float and these corners are juxtaposed the aforementioned curved surface. Further in the present disclosure, this is accomplished by making one of these elements in the form of a cylinder and the other square in horizontal in cross section. Still further, in the present disclosure, the container is in the form of an open top cylinder and the float is square in horizontal cross section. The construction is such that the vertical corners of the float provide vertical sections which are juxtaposed the inner wall of the container whereby the float will remain erect while floating in the liquid.

Thus, is is apparent that the container and the float, as integral elements provide for maintaining the float erect witin the container i.e., no additional means are necessary for maintaining the float erect.

In the preferred embodiment, the float 24 is in the form of an open top container which together with proper indicia, provides a measuring cup.

Figure 1:
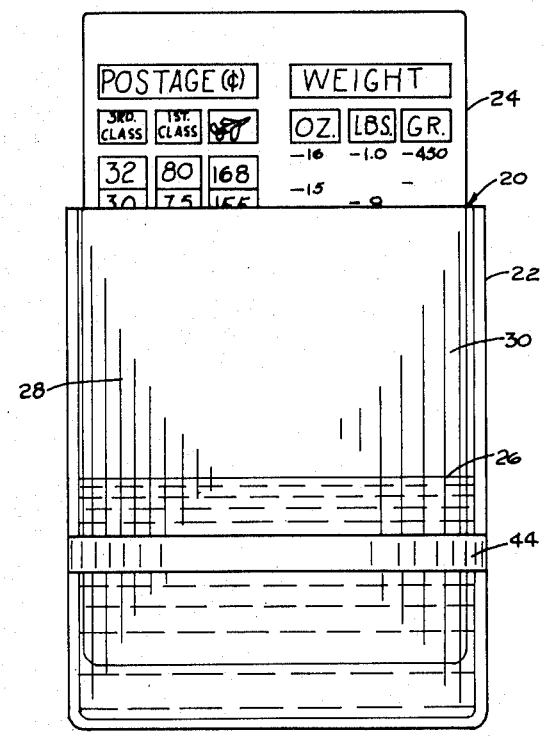
FIG. 1 is a side view of the combination hydrostatic scale and measuring cup.

Being square, the float 24 is provided with four side walls 28, 30, 32 and 34 each of which carries indicia. A replica of this indicia is shown in FIG. 3 which is divided into four sections 36, 38, 40 and 42, which are reproduced, respectively, on the four sides of the cup, sections 36 and 38 being shown on the side wall 28 and 30 in FIG. 1.

The containers 22 and 24 are formed of transparent material and are preferably formed of plastic material. A section of outer container 22 may be translucent or opaque for the purpose of indicating a suggested amount of liquid to be contained in the outer container. Such section is indicated at 44.

Thus it is apparent from the foregoing, that by virtue of the present invention, there has been provided a combination hydrostatic weighing scale and measuring cup which device is extremely simple in construction, is inexpensive to produce, and is accurate in its functions as weighing scale or measuring cup.

While the form of embodiment herein shown and described, constitutes preferred form, it is to be understood that other forms may be adopted falling within the scope of the claim that follows.

I claim:

A hydrostatic weighing scale, comprising in combination:
(A) An integral open top container element for a liquid, such as water;
(B) an integral floating element in the container element capable of floating within the liquid in the container element,
  (1) said container having an arcuately shaped surface defined by at least one vertical axis and the floating element having a dissimilar shaped horizontal cross section and including at least three vertically extending surfaces juxtaposed the said arcuate surface and forming means for guiding said floating element throughout the length of its vertical movement,
  (2) said floating element having horizontally extending indicia thereon, said indicia being spaced vertically of one another.

References Cited by the Examiner

UNITED STATES PATENTS

| | | | |
|---|---|---|---|
| 70,546 | 11/1867 | Goodes | 177—207 X |
| 112,043 | 2/1871 | Hudson | 177—207 |
| 232,245 | 9/1880 | Deschamps | 177—207 |
| 607,010 | 7/1898 | Baumann | 177—207 |
| 2,936,164 | 5/1960 | De Giorgio | 177—207 |

FOREIGN PATENTS

| | | |
|---|---|---|
| 478,200 | 9/1915 | France. |
| 561,388 | 5/1944 | Great Britain. |

LEO SMILOW, *Primary Examiner.*